United States Patent Office 3,283,230
Patented Nov. 1, 1966

3,283,230
MOMENTUM COMPENSATION IN CONTROL MEANS FOR ELECTRICAL POSITIONING MEANS
Richard Edward Davies, Antony Charles Nathan, and Edayathumangalam Minakshisundaram Gopal, Rugby, England, assignors to Associated Electrical Industries Limited, London, England, a British company
Filed July 10, 1963, Ser. No. 294,103
Claims priority, application Great Britain, May 13, 1963, 18,882/62
13 Claims. (Cl. 318—18)

This invention relates to momentum compensation in control means for electrical positioning means. One of its applications is to electrical shovels and electrical dragline excavators, in which during each digging cycle the boom carrying the shovel or the digging bucket is swung, by rotation of the platform carrying the driving motors and the counterweights, through a variable angle for discharge of the excavated soil. To stop the boom at the proper loading and unloading positions requires considerable skill, since the inertia of the boom with the shovel or bucket will depend upon the weight of the contents of the shovel or bucket and its radial position.

An object of the present invention is the provision of improved control means for electrical positioning means, in which automatic compensation for the momentum of the parts being positioned takes place.

According to the present invention, control means for electrical positioning means include energisation controlling means arranged to control the degree of energisation of the electrical positioning means, error measuring means sensitive to the magnitude of the positional error to be corrected by the positioning means, speed measuring means sensitive to the rate at which the positioning means are operating to correct this error, power sensitive means sensitive to the rate at which useful electrical power is being developed by the positioning means, acceleration measuring means activated by the speed measuring means and providing a measure of the instantaneous acceleration of the positioning means, and inertia determining means activated by the acceleration measuring means and the power sensitive means and providing a measure of the apparent inertia of the parts being accelerated, the energisation controlling means being automatically adjusted in accordance with the measured error, the speed of the positioning means, and the measured inertia to produce movement of the positioning means to eliminate the positional error with little if any overshoot.

The invention will now be described, by way of example, with reference to the accompanying drawings, in which.

Figure 1:
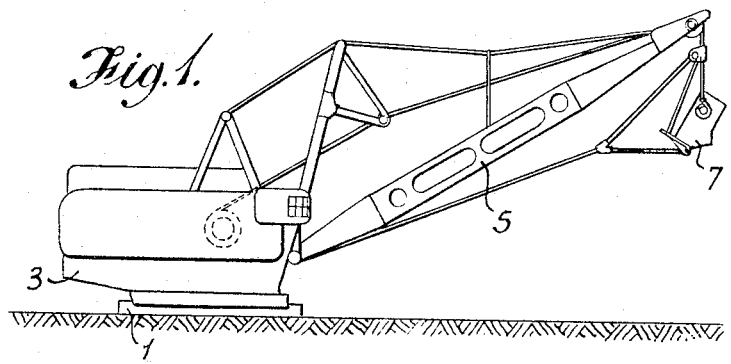
FIGURE 1 is a schematic side elevation of a walking dragline to which the invention is applied.

Referring first to FIGURE 1, the walking dragline includes a base 1 on which is mounted a rotatable body 3 provided with rollers engaging a suitable circular track on the base 1. Mounted on body 3 are the boom 5 of the dragline and the associated winding drums and driving motors by which the dragline bucket 7 can be dragged over the ground inwardly towards the foot of the boom, and then lifted, the boom then being swung or traversed to bring the bucket, now at an outer position on the boom, over the place where the bucket contents are to be dumped.

Figure 2:
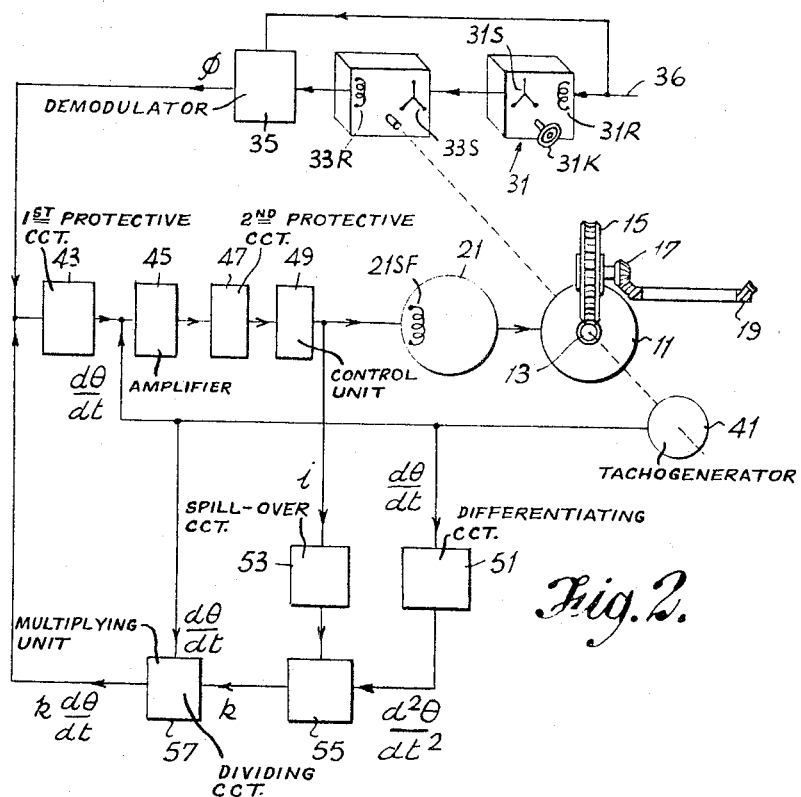
FIGURE 2 is a block diagram of an electrical control system arranged to control the swinging or traversing movements of a boom shown in FIGURE 1.

Referring now to FIGURE 2, the swinging or traversing movement of the body 1 is effected by an electric motor 11 driving through a worm 13 and worm wheel 15 a bevel pinion 17 which engages a bevel gear 19 mounted on the base 1. Motor 11 is part of a Ward-Leonard system, and is energised from the armature of a D.C. generator 21, the armature of which is driven either by an electric motor energised by a mains supply or by a diesel engine. Generator 21 has a shunt field winding 21SF, and the power input to the motor 11 is controlled by variation of the energisation of this field winding 21SF.

The operator controls the movement of the boom by rotating the single-phase energised rotor 31R of a master selsyn 31 by a control knob 31K. The three-phase stator winding 31S of this selsyn is connected to the three-phase stator winding 33S of a receiver selsyn 33 having a single-phase rotor 33R. Rotor 33R is coupled to the drive to the bevel pinion 17 in such a manner that the angular position of the rotor indicates the angular position of the boom 5. The output from the rotor 33R is applied to a phase-sensitive demodulator or rectifier 35 which is also supplied from the same single-phase A.C. source 36 as is rotor 31R. Demodulator 35, in conjunction with manually controlled selsyn 31 and automatically positioned selsyn 33, provides as output a signal indicative of angular error $\phi$.

A tachogenerator 41 is driven mechanically by the motor 11 and provides an output voltage the magnitude of which indicates the speed of the motor and thus the speed at which the boom is swinging. Indicating the angular position of the boom by the angle $\theta$, the output from the tachogenerator 41 indicates $d\theta/dt$. The signal from demodulator 35 (indicating angular error $\phi$) is passed through a speed reference limit circuit 43, is combined with the signal from tachogenerator 41 indicating the boom speed, amplified in an amplifier 45, and passed through a current reference limit circuit 47 to a control unit 49 which controls the degree of energisation of the shunt field winding 21SF.

The output from tachogenerator 41 is also fed to a differentiating circuit 51 which produces an output signal representative of $d^2\theta/dt^2$, i.e. the rate of acceleration of the motor 11 and thus of the boom 5. At the same time, a measure of the power fed to the motor 11 is fed through a spill-over (dead-space) circuit 53 to a dividing circuit 55, by which a signal $k$ is provided giving a measure of (motor power input)/(rate of change of speed of motor). This signal is clearly indicative of the inertia of the load on the motor. This signal $k$ and the signal $d\theta/dt$ from the tachogenerator 41 are fed to a multiplying unit 57 to produce an output indicative of $k.d\theta/dt$, i.e. the momentum of the moving parts, which is added to the output from the demodulator 35 so as to modify the control of the motor 11. Thus the motor 11 is controlled basically in accordance with the error $\phi$ between the position of the boom and the setting of the manual control, this control is modified in accordance with the speed at which the motor is running to correct this error, and this control is further modified in accordance with the inertia of the moving parts as indicated by the signal $k$.

Figure 3:
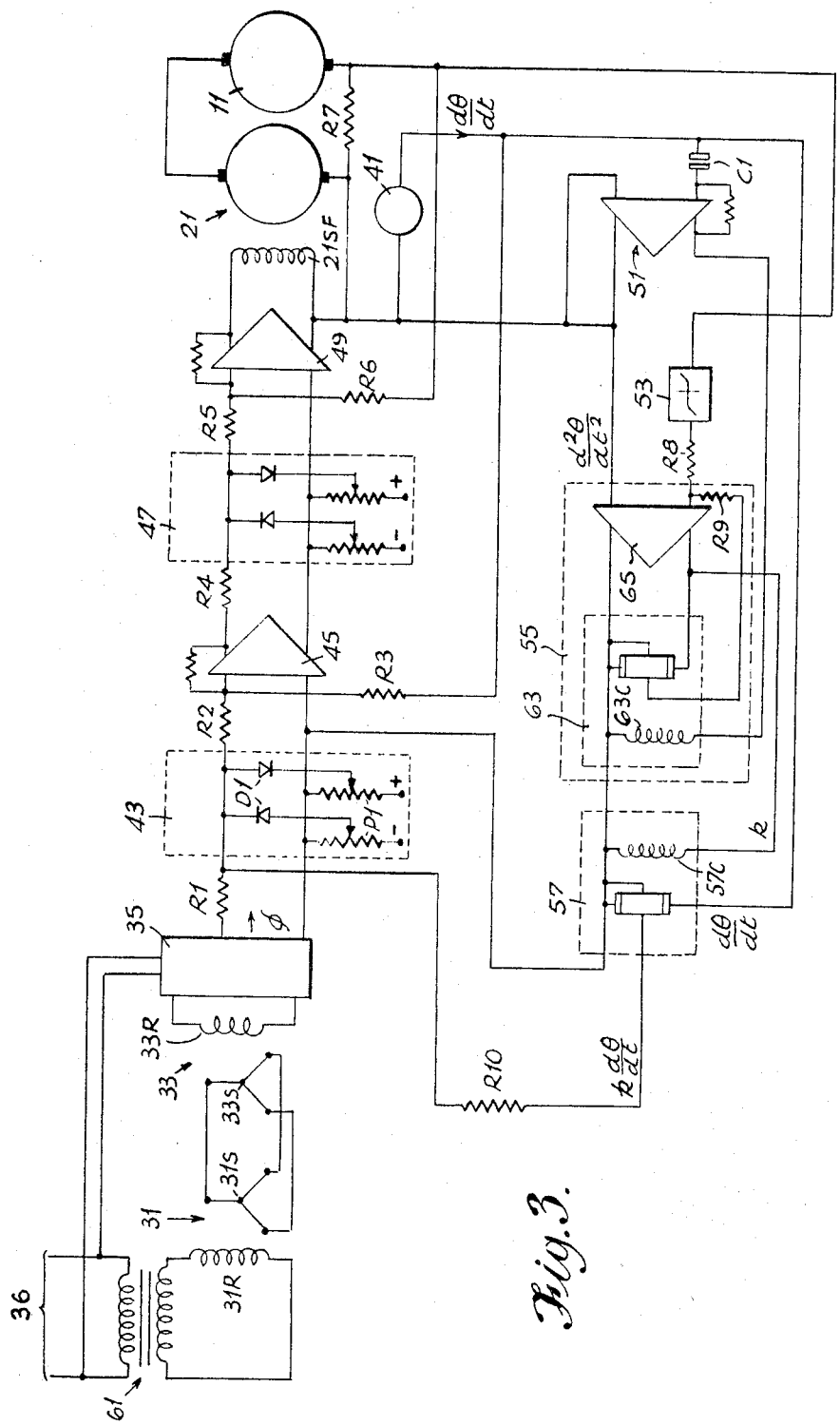
FIGURE 3 is a detailed circuit diagram of the system shown in FIGURE 2.

Referring now to the more detailed circuit of FIGURE 3, it will be seen that the selsyn rotor 31R is supplied from the source 36 through a transformer 61. The phase-sensitive demodulator or rectifier 35 is a device well known in the art, and provides an output in accordance with deviations of one A.C. input (from selsyn rotor 33R) compared with a reference A.C. input (from source 36). The output from demodulator 35 is applied through a resistor R1 to the limit circuit 43, which consists of two potentiometers P1 connected between one of the output terminals of the demodulator and, respectively, positive and negative bias sources, the sliders of the two potentiometers being connected respectively through two oppositely directed diodes D1 to the second output terminal of demodulator 35. As a result, the magnitude of the signal passed on by the limit circuit is limited, whatever its polarity.

Limit circuit 43 is coupled to the amplifier 47 through a resistor R2, and the output from tachometer 41 is applied to this amplifier through a resistor R3. The output from amplifier 47 is applied to the limit circuit 47 through a resistor R4, and circuit 47 is similar to the limit circuit 43 descrbed above. Circuit 47 is coupled to the control unit 49 through a resistor R5, and a feed-back signal is also applied to the input of unit 49 from the motor 11 through a resistor R6. The control unit 49 is a suitable power amplifier.

The differentiating circuit 51 is a form of amplifier well known in the art, and includes a capacitor C1 in its input. The measure of the power fed to the motor 11 is given by the voltage drop across a resistor R7 in its armature circuit, and is fed to the dividing circuit 55 through the spillover device 53. This device is also well known in the art, and provides zero output until the input signal rises above a preset level, thereupon passing on a signal related to the excess of the input signal above the preset level. The device 53 is so adjusted that it provides no output for motor currents corresponding to the frictional and other losses in the motor 21 and in swinging the boom 5, so that its output indicates the useful power provided by motor 21 to accelerate or decelerate the parts involved as the boom is swung. The output from device 53 is applied through a resistor R8 to the input of circuit 55.

The dividing circuit 55 includes a Hall effect multiplier 63 and a servo amplifier 65, the input to the magnetising coil 63 of the multiplier being the output from differentiating circuit 51, and the other input to the multiplier being the output from the amplifier 65. The output from the multiplier is fed back through a resistor R9 to the input of amplifier 65. In such a multiplier, output voltage of multiplier=

(a constant) [current in coil 63C $\times$ input current]

so that:
input to amplifier 65=

$d^2\theta/dt^2 \times$ amplifier output $\times$ (a constant)

and so that amplifier output=
(amplifier input)/$(d^2\theta/dt^2)$
=(power input to motor 11)/(acceleration product by that power input)
=instantaneous value of inertia of moving parts, which has been denoted by $k$.

The output from this amplifier 65 is applied to the magnetising coil 57C of a Hall effect multiplier which consitutes the multiplying unit 57, and the output of the tachogenerator 41 is applied as the input current of this multiplier. The output voltage of the multiplier is therefore the product of the instantaneous value of the inertia of the moving parts and the actual speed of those parts, i.e. corresponds to the instantaneous value of the momentum of those parts. This output voltage is applied through a resistor R10 to the input to limit circuit device 43, and adds a momentum term to the control of the energisation of the motor 11.

In use of the apparatus described above, starting from a condition when the bucket 7 is at the innermost limit of its digging stroke, the operator will adjust the knob 31K to cause the boom to swing to the discharge position. Initially the output from the tachogenerator 41 will be zero, so that the signal applied through the resistor R3 will be zero, and the signal applied through the resistor R10 (being the product of speed and inertia) will be zero. In these circumstances, the error signal $\phi$ from the phase sensitive demodulator 35 will cause the shunt field 21SF of the generator 21 to be energised in such a manner that the motor 11 starts up and runs in such a direction as to reduce the error signal $\phi$ to zero. In the absence of any "speed" term, applied through resistor R3, the current reference signal fed from the amplifier 45 to the system including amplifier 49 could be excessive, but the limit circuit 47 limits the value of this signal. The resistors R5 and R6 form a T-mixing circuit whereby a reference voltage appearing on the end of R5 remote from amplifier 49 calls for an opposing current feedback appearing at the current feedback resistor and this arrangement together with the amplifier 49 and generator 21 constitute a continuous current control loop which is within the speed control loop. The function of limit circuit 47 is to restict the input to this current control system.

As the motor 11 speeds up, the output from tachogenerator 41 rises. As applied through resistor R3, this increased output tends to counter the error signal $\phi$ so that the rate at which the moving parts are accelerated to correct error $\phi$ is reduced to correspond to the motor speed. As applied to the devices 55 and 57, this increased output provides a "momentum" term, applied through the resistor R10, which tends to reduce the rate of working of the motor as the momentum of the moving parts increases, so that the motor will be able to overcome that momentum to bring the boom to rest at the proper angular position without, or substantially without, overshoot.

Normally the motor 11 will now achieve its full normal running speed, since the angle of swing of the boom will not be sufficient for it to do so, so that the motor is initially energised to produce acceleration and then reversley energised to produce braking. Should the boom be swung through a large angle, so that the motor reaches a steady speed, then the term $d\theta/dt$ becomes constant and the term $d^2\theta/dt^2$ becomes equal to zero. Since the "momentum" signal applied through resistor R10 tends to reduce the current supplied to the motor 11, when this term becomes equal to zero an excessive current could flow. However, the limit circuit 43 limits the value of the signal passing from the demodulator 35 to the part of the circuit including amplifier 43 to a safe value.

The amount of position error signal which is allowed to be applied to the speed control system i.e. to act as speed reference is limited by limit circuit 43, and having obtained the difference between the speed reference and speed feedback i.e. speed errors, the amount of current which is called for in the Ward-Leonard loop is subsequentially limited by limit circuit 47. The setting of limit circuit 43 will be such as to call for a safe speed from the motor.

Usually the operator will energise other motors so that the bucket 7 will move radially outwards along the boom 5 while the boom is swinging to the discharging position. Since the inertia term is continuously measured by the division of the power term by the "acceleration" term, this change in bucket radius does not affect the effectiveness of the control, except in so far as the change in the position of the bucket may make some slight change in the frictional forces to be overcome in swinging the boom.

During the return movement of the boom, the control system is equally effective, the operator usually moving the bucket 7 to its outermost position during the return swinging movement of the boom, ready for the next excavating operation.

It will be seen that the invention is also applicable to motor control systems, other than Ward-Leonard systems, which include energisation controlling means arranged to control the degree of energisation of the motor. Further, the error detecting means need not be an arrangement of selsyns, but could be equivalent arrangement of potentiometers, or other suitable devices.

Further, although in the case of large machines such as draglines and mechanical shovels the electrical positioning means will always be an electrical motor, the invention is also applicable to much smaller mechanisms in which the electrical positioning means may be some form of solenoid or other electromagnet.

What we claim is:

1. Control means for electrical positioning means comprising:
    (a) energisation controlling means arranged to control the degree of energisation of the electrical positioning means;
    (b) error measuring means sensitive to the magnitude of a positional error to be corrected by the positioning means;
    (c) speed measuring means sensitive to the rate at which the positioning means are operating to correct this error;
    (d) power sensitive means sensitive to the rate at which useful electrical power is being developed by the positioning means;
    (e) acceleration measuring means activated by the speed measuring means and providing a measure of the instantaneous acceleration of the positioning means;
    (f) inertia determining means activated by the acceleration measuring means and the power sensitive means and providing a measure of the apparent inertia of the parts being accelerated;
    (g) means by which the energisation controlling means are automatically adjusted in accordance with the measured error, the speed of the positioning means, and the measured inertia to produce movement of the positioning means to eliminate the positional error with little if any overshoot.

2. Control means according to claim 1, in which the electrical positioning means consist of an electric motor.

3. Control means according to claim 2, in which the energisation controlling means is a Ward-Leonard system energising the said electric motor.

4. Control means according to claim 1, in which the error measuring means is a selsyn system in which a master selsyn is manually positioned to indicate a desired position and a receiver selsyn is automatically positioned by the electrical positioning means to indicate the actual position, and the two selsyns are connected in an electrical network the output of which indicates the positional error.

5. Control means according to claim 4, in which the master selsyn includes an energised single phase input winding and a three-phase output winding, setting of the master selsyn incurs relative rotation between the input and output windings, the receiver selsyn includes a three-phase input winding energised by the output winding of the master selsyn, and a single phase output winding, setting of the receiver selsyn incurs relative rotation between its input and output windings, a phase sensitive demodulator has as one input the output from the output winding of the receiver selsyn and has as its second input a signal derived from the supply by which the master selsyn is energised, and the output from the demodulator indicates by its magnitude and sense the magnitude of the positional error.

6. Control means according to claim 1, in which the speed measuring means is a tacho-generator driven directly or indirectly by the electrical positioning means.

7. Control means according to claim 1, in which the power sensitive means includes an impedance arranged in the energisation circuit of the electrical positioning means and the rate at which power is being delivered to the positioning means is indicated by the voltage developed across this impedance.

8. Control means according to claim 7, in which the voltage developed across the impedance is applied to a spill-over (dead-space) device which provides no output until the voltage developed across the impedance exceeds a value representing the power used in overcoming frictional and other losses in the operating of the positioning means, so that the output from the spill-over (dead-space) device indicates the useful power effecting acceleration of the positioning means.

9. Control means according to claim 1, in which the acceleration measuring means is a differential amplifier to which is applied an input signal indicative of the speed of the positioning means and the output of which thus indicates the instantaneous acceleration of these positioning means.

10. Control means according to claim 1, in which the inertia determining means comprise the combination of a Hall-effect multiplier device and a servoamplifier, the two inputs to the Hall-effect device being respectively from the acceleration measuring means and from the output from the servoamplifier, the output from the power sensitive means being applied to the servoamplifier as its input, and the amplifier output providing the measure of the apparent inertia of the parts being accelerated.

11. Control means according to claim 1, in which the measure of the apparent inertia and the output of the speed measuring means are applied to a Hall-effect multiplying device respectively as the two inputs of the device, and the output of the device, representative of the instantaneous momentum of the moving parts, is combined with the output of the error measuring means and applied through a magnitude limiting circuit to the energisation controlling means.

12. Control means according to claim 11, in which the output of the speed measuring means is combined with the combined outputs of the error measuring means and the measure of the instantaneous momentum, and applied through a further magnitude limiting circuit to the energisation controlling means.

13. A mechanical excavator provided with electrical positioning means by which a boom of the excavator can be traversed, and with control means for the electrical positioning means according to claim 1.

No references cited.

ORIS L. RADER, *Primary Examiner.*

JOHN F. COUCH, *Examiner.*

J. DOBECK, *Assistant Examiner.*